R. B. BRYAN.
KNOTTER.
APPLICATION FILED OCT. 18, 1910.
1,033,669.
Patented July 23, 1912.
2 SHEETS—SHEET 2.
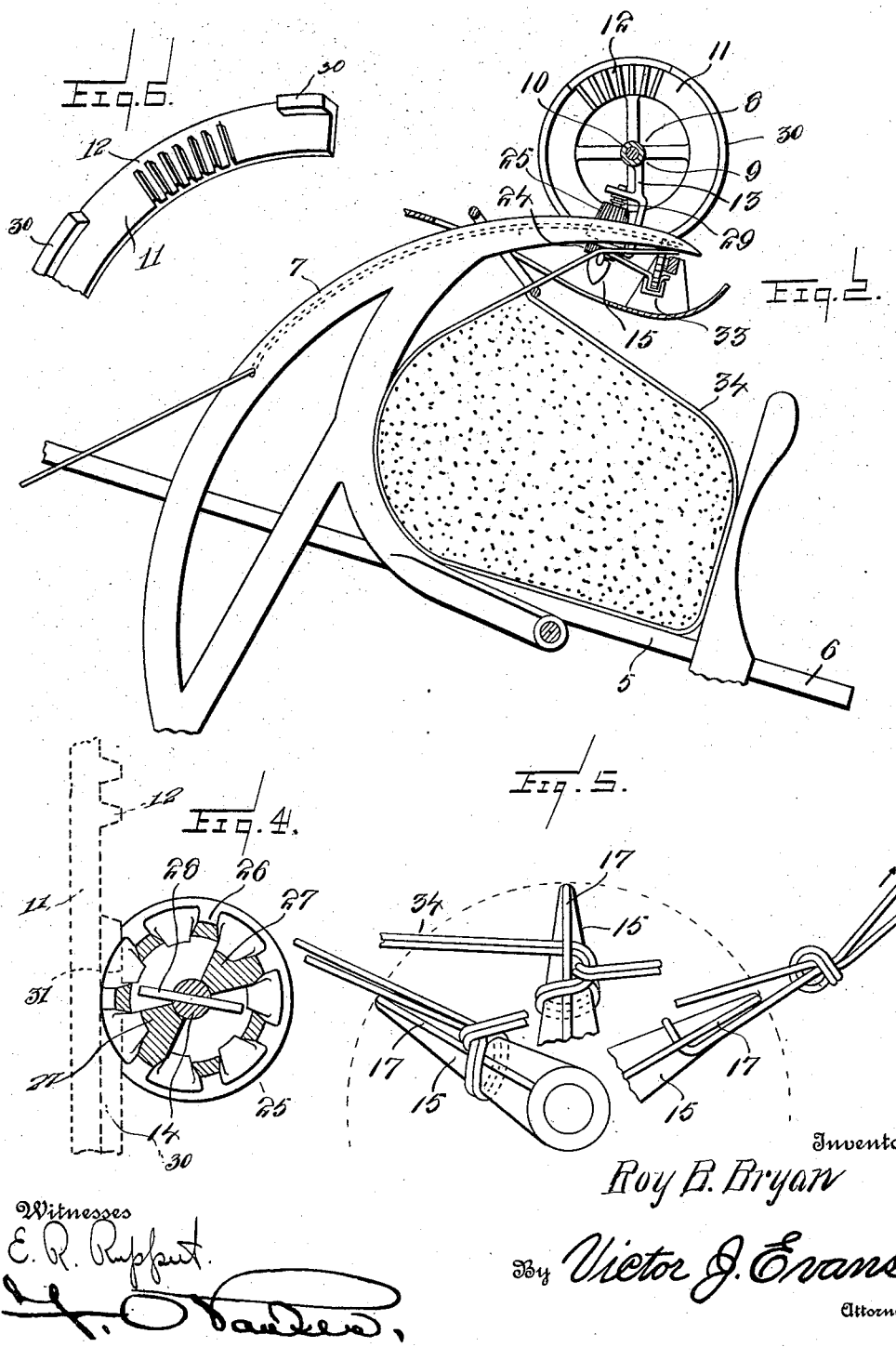
Inventor
Roy B. Bryan
By Victor J. Evans
Attorney
Witnesses
E. R. Ruppert

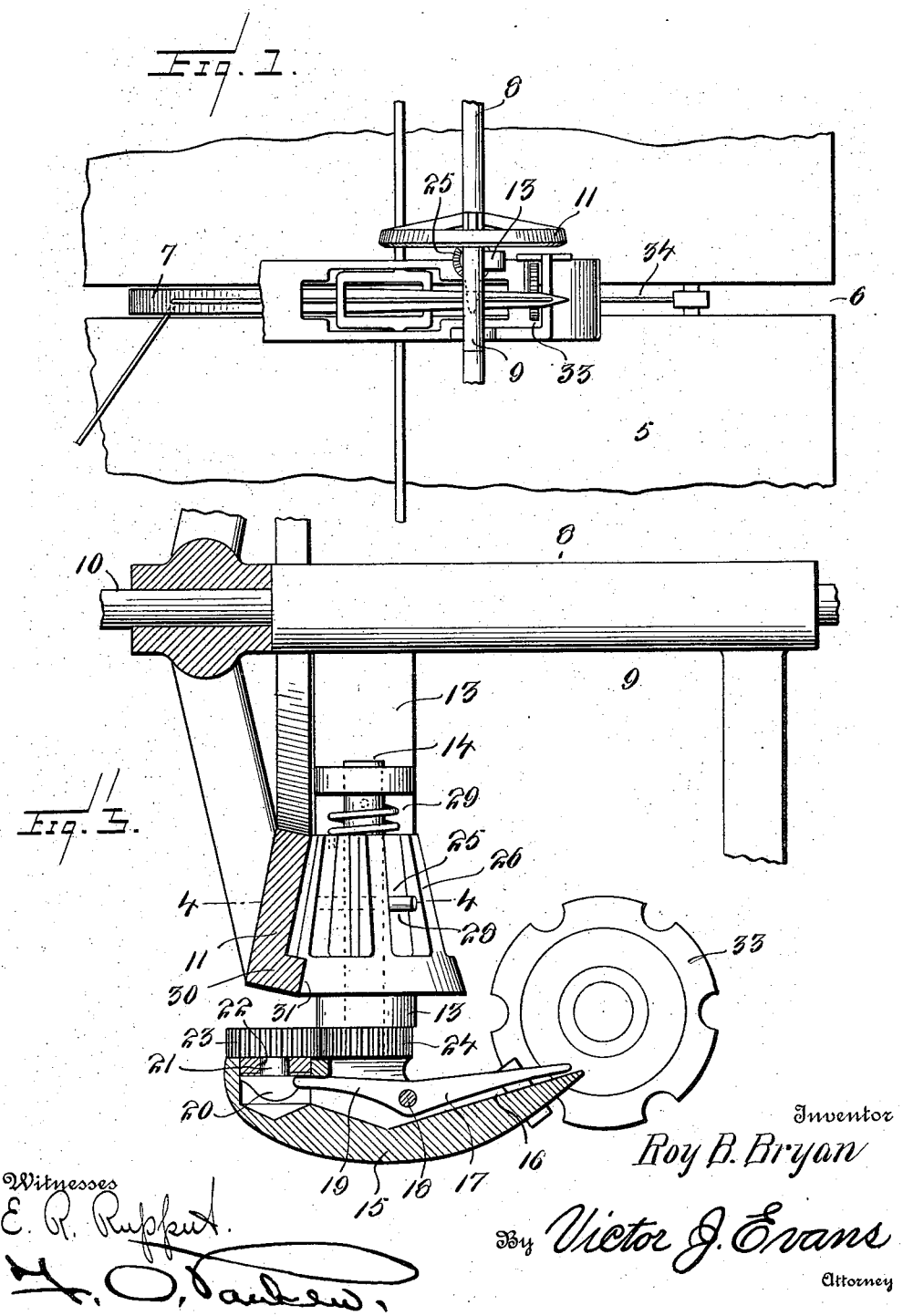

UNITED STATES PATENT OFFICE.

ROY B. BRYAN, OF LA FAYETTE, INDIANA.

KNOTTER.

1,033,669.  Specification of Letters Patent.  Patented July 23, 1912.

Application filed October 18, 1910. Serial No. 587,717.

*To all whom it may concern:*

Be it known that I, ROY B. BRYAN, a citizen of the United States, residing at La Fayette, in the county of Tippecanoe and State of Indiana, have invented new and useful Improvements in Knotters, of which the following is a specification.

The invention relates to a knotter, and more particularly to the class of tensioned knotting devices for binders or the like.

The primary object of the invention is the provision of a knotter in which the knotting jaws will be movable independently of the driving connections therewith, thereby assuring the proper tying of the knot in the binding cord, without the possibility of breaking of the coöperative parts of the knotter, the independent movement of the knotter being adapted to permit the re-positioning of the jaws in normal position, after tying the knot in the cord, so that the operation of the knotter may be repeated.

Another object of the invention is the provision of a knotter in which the knot tying jaws are automatically operated and are capable of being tensioned for independent movement, whereby the said jaws may be brought rapidly to original position, subsequent to the tying of the knot, for the continued knotting operation.

A further object of the invention is the provision of a knotter which is simple in construction, positive and efficient in operation, and inexpensive to manufacture.

With these and other objects in view, the invention consists in the construction, combination and arrangement of parts, as will be hereinafter more fully described, illustrated in the accompanying drawings, and pointed out in the claims hereunto appended.

In the drawings: Figure 1 is a fragmentary top plan view of a grain deck and needle of a binder, with the knotter mounted upon the deck in position relative to the needle and constructed in accordance with the invention. Fig. 2 is a fragmentary side elevation thereof. Fig. 3 is a vertical sectional view through the knotter. Fig. 4 is a horizontal sectional view on the line 4—4 of Fig. 3. Fig. 5 is a diagrammatic view, showing several positions of the knotter jaws, and the mode of tying the knot thereby. Fig. 6 is a fragmentary perspective view of the driving gear for operating the knotter.

Similar reference characters indicate corresponding parts throughout the several views of the drawings.

Referring to the drawings by numerals, 5 designates a portion of the grain deck of a binder of the ordinary well-known construction, the deck being provided with the usual slot 6, through which works the twine or cord carrying needle 7, and upon this deck is fixed in any suitable manner a knotter frame 8, through which the needle 7 works, when in action for binding into bundles grain or other material supported upon the deck. The knotter frame is formed with the usual bearing 9, in which is journaled a shaft 10, the latter carrying a knotter driving gear 11 which is fixed thereto in any suitable manner, and is provided with a series of teeth 12, preferably seven in number, disposed contiguous to the periphery of said gear for intermittently operating the gearing of a knotter, presently described.

Formed on the knotter frame and depending from the bearing 9 thereof is a yoke 13, in which is journaled a rotatable spindle 14 adapted for rotation therein, which has secured to its lower end a lower jaw 15 of a knotter hook, the jaw 15 being provided with a channel or recess 16 disposed longitudinally therein for receiving an upper movable jaw 17 of the said knotter hook. This upper jaw 17 is connected to the lower jaw by means of a pivot 18, and is formed with a heel extension 19 engaged by a cam disk or roller 20 fixed to a stud axle 21 journaled in the lower jaw 15 in parallel relation to the spindle 14. The said cam disk or roller is confined within a suitable recess 22 formed in the rear end of the said lower jaw. Upon the stud axle 21 is fixed a cog gear 23 meshing with a similar cog gear 24 fixed to the yoke 13, so that upon the rotation of the spindle 14 in the yoke the cog gear 23 will revolve about the stationary cog gear 24 on the yoke, thereby rotating the cog gear 23 for imparting a complementary movement to the cam disk 20, which latter serves to open and close the upper jaw 17 with respect to the lower jaw 15 of the knotter hook.

Surrounding the spindle 14 and mounted for independent rotary movement thereon in the yoke 13 is a tapered pinion 25, the same being formed at its smaller end with gear teeth 26 adapted, at predetermined periods of time, for engagement with the gear teeth 12 on the driving gear 11, so that a complete revolution will be imparted to the said pinion 25 at different intervals of time, and thereby intermittently rotating the knotter hook. This pinion 25 is internally cut away, medially of its ends, to provide diametrically opposed inwardly projecting abutment wings 27, with which is adapted to normally engage a stop pin 28 fixed transversely in the spindle 14, and projecting laterally at opposite sides thereof, the pin 28 being adapted to alternately strike the opposite sides of the wings 27 to lock the shaft 14 with said pinion 25, whereby the same will rotate together, for a purpose presently described.

Surrounding the spindle 14, between one end of the pinion 25 and the adjacent end of the yoke 13, is a coiled tension spring 29, one end of which is fixed in the spindle 14, and its opposite end is fixed to the pinion 25, the spring being designed to normally hold the pin 28 in contact with the wings 27, against the sides thereof facing the direction of rotation of the pinion 25, yet permitting the knotter hook to yield independently of the pinion 25, when the latter is held fast against rotation by the driving gear 11, in a manner as will be hereinafter described.

The driving gear 11 for actuating the pinion 25 is formed, at its periphery, with an inturned flange 30, the same extending circumferentially thereof throughout a greater portion of its diameter to provide a gap at the point of location of the series of teeth 12, and this flange 30, at predetermined intervals of time, is adapted to slidably engage a flat surface 31 formed on the said pinion 25 at one end thereof, on rotation of the said driving gear 11. Thus, in this manner, the pinion 25 is locked against rotation after the teeth 12 of the said driving gear have disengaged from the teeth 26 of the pinion, and the spindle 14 will become tensioned when a pull is exerted upon the knotter hook for effecting the proper tying of a knot in the binding cord or twine.

Suitably journaled in the knotter frame, forwardly of the knotter hook, is a notched cord holding disk 33 of the usual well-known type, which receives and grips the binding cord or twine 34, threaded in the needle 7, whereby the said cord or twine 34 will be cast about a bundle of material for the binding thereof.

In the operation of the knotter, assuming that the cord or twine 34 has been cast about a bundle of material upon the deck 5, the upper jaw 17 which is now normally opened, will be caused to close, gripping the cord or twine 34, and thereafter the knotter in its rotary movement will twist the said cord or twine, and cause it to be tied into a knot, the successive steps of the knotter, during its rotation, being shown in Fig. 5 of the drawings, while tying the knot in the cord or twine. When the knot has been fully tied in the cord 34, after it has been cast about a bundle of material on the deck, the pinion 25 is interrupted in its movement by the engagement of the flange 30 with the flat surface 31 on the pinion 25, so that the said pinion will be held fast, and when the bundle bound by the cord 34 is discharged from the deck 5, the said cord engaged between the knotter jaws 15 and 17 of the knotter hook will pull upon the latter, causing the same to turn independently of the pinion 25, and by reason of the engagement of the spring therewith, the said knotter hook will be tensioned, so that on this movement, the knot will be securely tied in the cord and the latter slipped from between the jaws thereof, thereby freeing the bundle. It is of course understood that the cord 34 is severed in the required length by means of a knife cutting mechanism, not shown in the drawings.

What is claimed is:

1. In a knotter of the class described, a driving gear having an inturned peripheral flange extending throughout a greater portion of the circumference thereof to provide a gap, a series of teeth arranged on the driving gear at the point of location of the gap, a rotatable pinion alternately engageable with the teeth and flange of the driving gear, a knotter having stationary and pivoted jaws connected with the pinion for limited movement independently thereof, and means for tensioning the said knotter when moving independently of the pinion.

2. In a knotter of the class described, a driving gear having an inturned peripheral flange extending throughout a greater portion of the circumference thereof to provide a gap, a series of teeth arranged on the driving gear at the point of location of the gap, a rotatable pinion alternately engageable with the teeth and flange of the driving gear, a knotter having stationary and pivoted jaws connected with the pinion for limited movement independently thereof, means for tensioning the said knotter when moving independently of the pinion, and coöperative gears operative upon the rotation of the knotter for opening and closing the movable jaw.

3. In a knotter of the class described, a driving gear having an inturned peripheral flange extending throughout a greater portion of the circumference thereof to provide a gap, a series of teeth arranged on the driving gear at the point of location of the gap, a rotatable pinion alternately engageable with the teeth and flange of the driving gear, a knotter having stationary and pivoted jaws connected with the pinion for limited movement independently thereof, means for tensioning the said knotter when moving independently of the pinion, coöperative gears operative upon the rotation of the knotter for opening and closing the movable jaw, and means limiting the movement of the knotter independently of the pinion.

In testimony whereof I affix my signature in presence of two witnesses.

ROY B. BRYAN.

Witnesses:
 EDGAR G. COLLINS,
 SAMUEL SIMMS.

Copies of this patent may be obtained for five cents each, by addressing the "Commissioner of Patents, Washington, D. C."